US008331360B1

(12) United States Patent
Ashwood-Smith et al.

(10) Patent No.: US 8,331,360 B1
(45) Date of Patent: Dec. 11, 2012

(54) METHOD AND APPARATUS FOR LAYER 2 FAST RE-CONFIGURATION IN A ROUTING BRIDGE NETWORK

(75) Inventors: Peter Ashwood-Smith, Hull (CA); Guoli Yin, Nepean (CA); Ravi Ravindran, Ottawa (CA)

(73) Assignee: Rockstar Consortium US LP, New York, NY (US)

( * ) Notice: Subject to any disclaimer, the term of this patent is extended or adjusted under 35 U.S.C. 154(b) by 685 days.

(21) Appl. No.: 11/262,665

(22) Filed: Oct. 31, 2005

Related U.S. Application Data

(60) Provisional application No. 60/708,963, filed on Aug. 17, 2005.

(51) Int. Cl.
*H04L 12/28* (2006.01)
(52) U.S. Cl. ........................................ 370/389; 709/249
(58) Field of Classification Search .................. 370/401, 370/404, 408, 351; 709/249, 252
See application file for complete search history.

(56) References Cited

U.S. PATENT DOCUMENTS

| 6,006,275 | A  | * | 12/1999 | Picazo et al. ................. 709/249 |
| 2002/0101875 | A1 | * | 8/2002 | Lui et al. ....................... 370/402 |
| 2003/0193959 | A1 | * | 10/2003 | Lui et al. ....................... 370/401 |
| 2004/0218591 | A1 | * | 11/2004 | Ogawa et al. ................. 370/364 |
| 2004/0227622 | A1 | * | 11/2004 | Giannini et al. ......... 340/310.01 |
| 2005/0204062 | A1 | * | 9/2005 | Sekine et al. ................. 709/245 |

* cited by examiner

*Primary Examiner* — Robert Wilson
*Assistant Examiner* — Wei Zhao
(74) *Attorney, Agent, or Firm* — Anderson Gorecki & Rouille LLP

(57) ABSTRACT

A method and apparatus in provided which enables fast layer 2 reconfiguration in a network that includes Routing Bridges. Each Routing Bridge stores, for each forwarding target, identifiers of a primary next Rbridge and an alternate next Rbridge. The forwarding target may be a network end node, or an Egress Rbridge associated with the network end node. In response to a trigger condition, layer 2 communications are selectively switched from a path that includes the primary next Rbridge device to a path that includes the alternate next Rbridge device.

14 Claims, 7 Drawing Sheets

METHOD AND APPARATUS FOR LAYER 2 FAST RE-CONFIGURATION IN A ROUTING BRIDGE NETWORK

RELATED APPLICATIONS

This application claims priority under 35 U.S.C. §119(e) to provisional patent application Ser. No. 60/708,963, filed Aug. 17, 2005 and incorporated herein by reference.

FIELD OF THE INVENTION

This invention relates generally to the field of networks, and more particularly to a method and apparatus for fast re-configuration of communications at the data link layer in a network including routing bridges.

SUMMARY OF THE INVENTION

According to one aspect of the invention, a method of re-configuring a network comprising a plurality of routing-bridges (Rbridges) includes the steps of storing, for an end node in the network, a primary identifier of a primary Rbridge and an alternate identifier of an alternate Rbridge. The primary Rbridge and alternate Rbridge identifiers identify Rbridge devices to which communications destined for the end node should be forwarded. The method includes the step of selectively forwarding a packet destined for the end node to either the primary Rbridge or the alternate Rbridge device in response to a monitored status of the primary Rbridge. According to one aspect of the invention, the primary Rbridge identifier and the alternate Rbridge identifier are layer 2 addresses of the respective primary Rbridge and alternate Rbridge. Such an arrangement permits fast reconfiguration of a Routing Bridge network upon detection of a trigger condition, such as a failed link or node, a detected congestion or a detected u-turn.

DETAILED DESCRIPTION

Figure 1A:
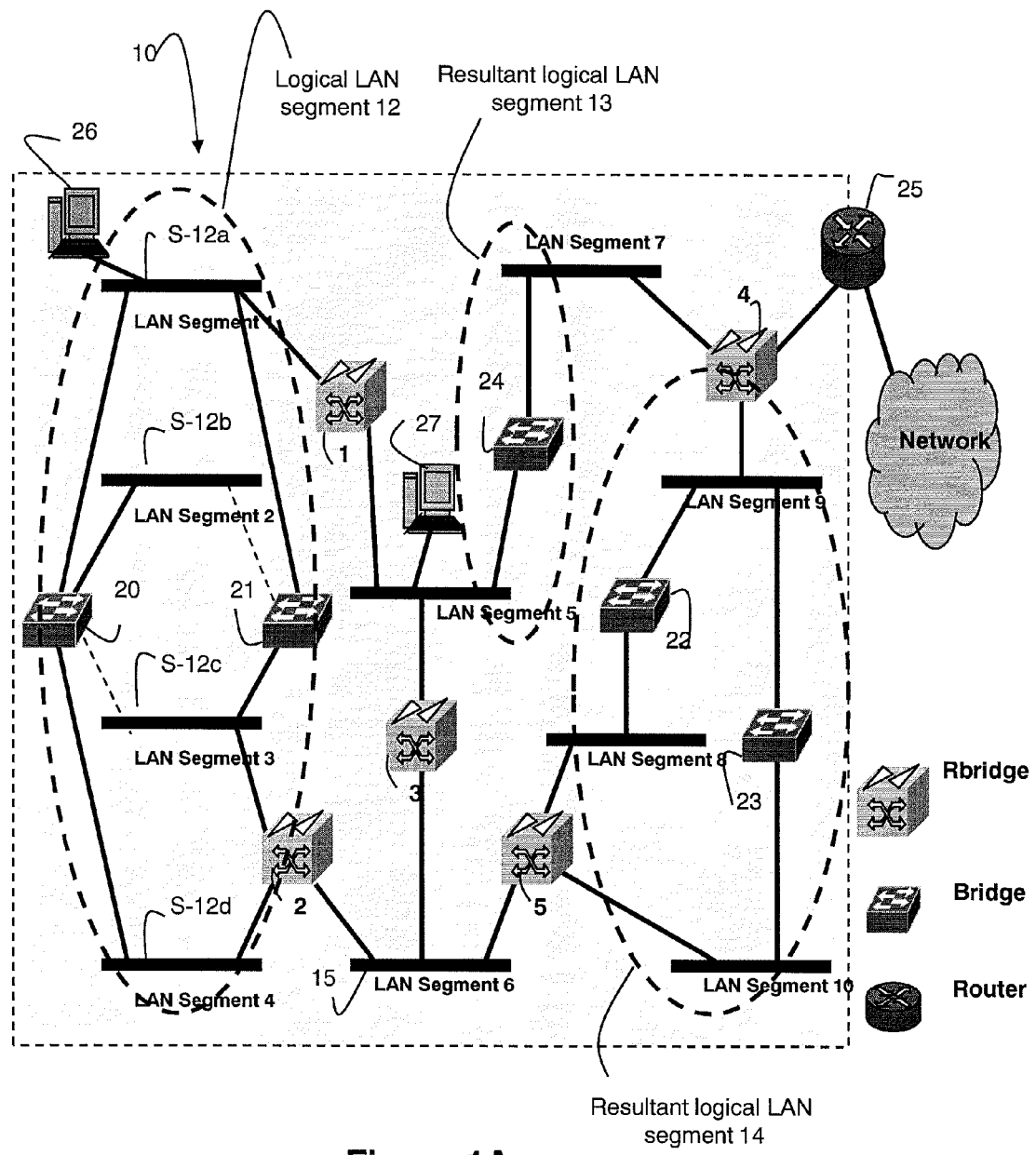
FIGS. 1A-1C are a diagram of a network including Routing Bridges capable of fast reconfiguration according to the present invention, provided to illustrate various stages of initial configuration.

Layer 2 refers to the Data Link layer of the commonly-referenced multilayered communication model, Open Systems Interconnection (OSI). The Data Link layer is concerned with moving data across the physical links in the network. In a network, the term 'bridge' or 'switch' is used to designate a device that redirects data messages at the layer 2 level, using the destination Media Access Control (MAC) address to determine where to direct the message. Bridges are used to transparently connect many physical links into a single layer 2 Local Area Network (LAN).

The layer 2 device connectivity is determined through the use of the Spanning Tree Protocol (STP). The Spanning Tree Protocol generally maps the network topology to that of a spanning tree in graph theory. A root bridge is automatically selected by a spanning tree algorithm (STA) as the root of the minimum spanning tree. Bridges exchange Bridge Protocol Data Units (BPDUs), which include information regarding the bridge identifiers, the port identifiers, costs and root bridge identifiers. Using this information, a minimum spanning tree is built by selective assignment of state (i.e., listening, learning, forwarding, blocking or disabled) to the ports of each of the bridging devices.

The minimum spanning tree is designed such that there is only one active path to any destination at any one point in time to avoid the same frame arriving at the destination multiple times, causing dysfunction. The STA ensures that if multiple paths exist to the same destination then all but one will be blocked.

There are advantages and disadvantages associated with STP. One advantage is that its operation is transparent to end-node devices, and thus a plug-and-play environment is provided where devices may be easily added or removed from network segments without the need for topology reconfiguration. One disadvantage is that there may be temporary loops that are formed as the Spanning Tree Algorithm (STA) resolves the network topology. In addition, the final path that is selected by the STA, although loop free, may not be optimal for each destination, and may quickly become saturated as a high concentration of traffic is forwarded on the segments of the tree.

One method of ensuring that an optimal path to each destination is provided is to use routers, instead of bridges, to connect networks. Routers forward data using Layer 3 protocols of the OSI protocol stack. Layer 3, also referred to as the network layer, routes data to different LANs and WANs based on network addresses, such as Internet Protocol (IP) addresses. Layer 3 routing protocols include Open Shortest Path First (OSPF), Intermediate-System to Intermediate System (IS-IS), Border Gateway Protocol (BGP) etc. One disadvantage of using routers, however, is that they typically need configuration on a per link basis; as a result, the addition or deletion of network devices on network segments requires network re-configuration that is not transparent to the end node devices.

To overcome the individual problems of bridges and routers, a new technology, referred to as Transparent Routing and/or Routing Bridges (Rbridges) has been developed. Routing Bridges incorporate concepts of bridging and routing to enable transparent layer 2 connectivity with improved path selection and loop-free configuration.

The basic design of an Rbridge network is described in "Rbridges: Transparent Routing" by Radia Perlman, IEEE Infocom 2004, incorporated herein by reference. According to one aspect of the present invention, Rbridge devices are modified using the concepts presented below to provide fast layer 2 network reconfiguration in the presence of one or more detected trigger conditions. The trigger conditions include, but are not limited to the failure of a link spanning two Rbridges, the failure of an Rbridge device, or congestion associated with Rbridge communications. In addition, as will be described in more detail below, a trigger condition may be a detection of a return of the packet from the identified primary next Rbridge device; essentially detection that the packet has taken a u-turn due to congestion or failure downstream of the primary next R-bridge device. As will be appreciated from the description below, other trigger conditions, such as Quality of Service (QoS) or Traffic Engineering (TE) triggers may be substituted herein without affecting the scope of the present invention. A method that may be used to enable Rbridge devices to quickly perform layer 2 reconfiguration will now be described with regards to the flow diagram of FIG. 2 and the network diagrams of FIGS. 1A-1C.

Figure 1B:
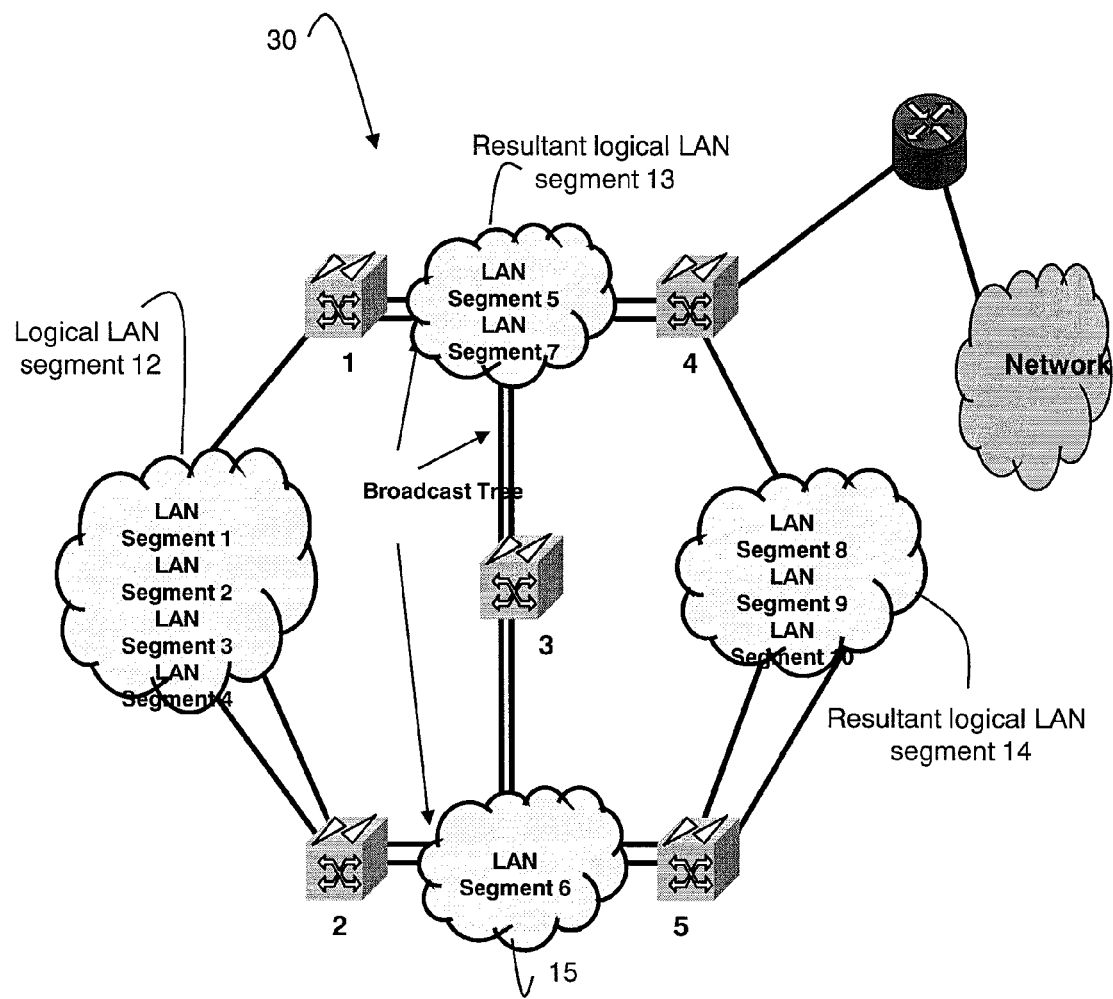
Figure 1C:
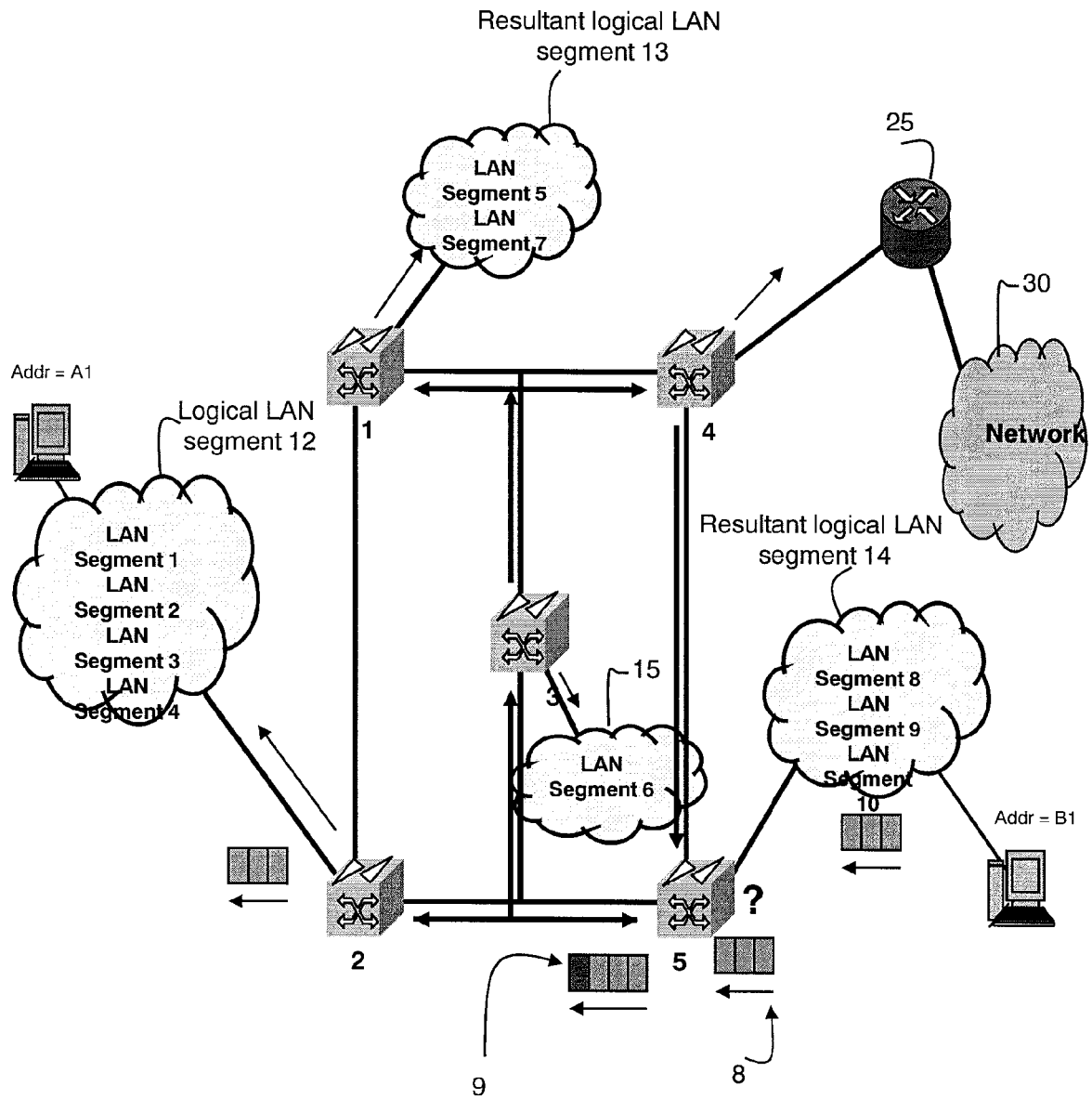
Figure 1C:
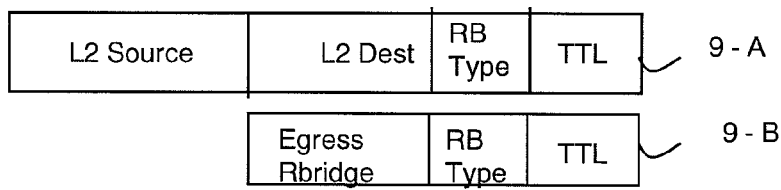

FIGS. 1A-1C each provides a view of an Rbridge network at a different stage of network configuration. The network includes a variety of network devices, including Routing Bridges (Rbridges) 1-5 and legacy devices such as bridges 20-24 and router 25. The Rbridges 1-5 have been modified according to the present invention to support fast layer-2 reconfiguration upon detection of trigger conditions similar to those described above. As shown in FIG. 1A, initially each Rbridge device may be physically coupled to one or more LAN segments. Connectivity is managed in an Rbridged network by logically grouping LAN segments, and limiting accessibility to each logically grouped LAN segment to a single Rbridge device.

Figure 2:
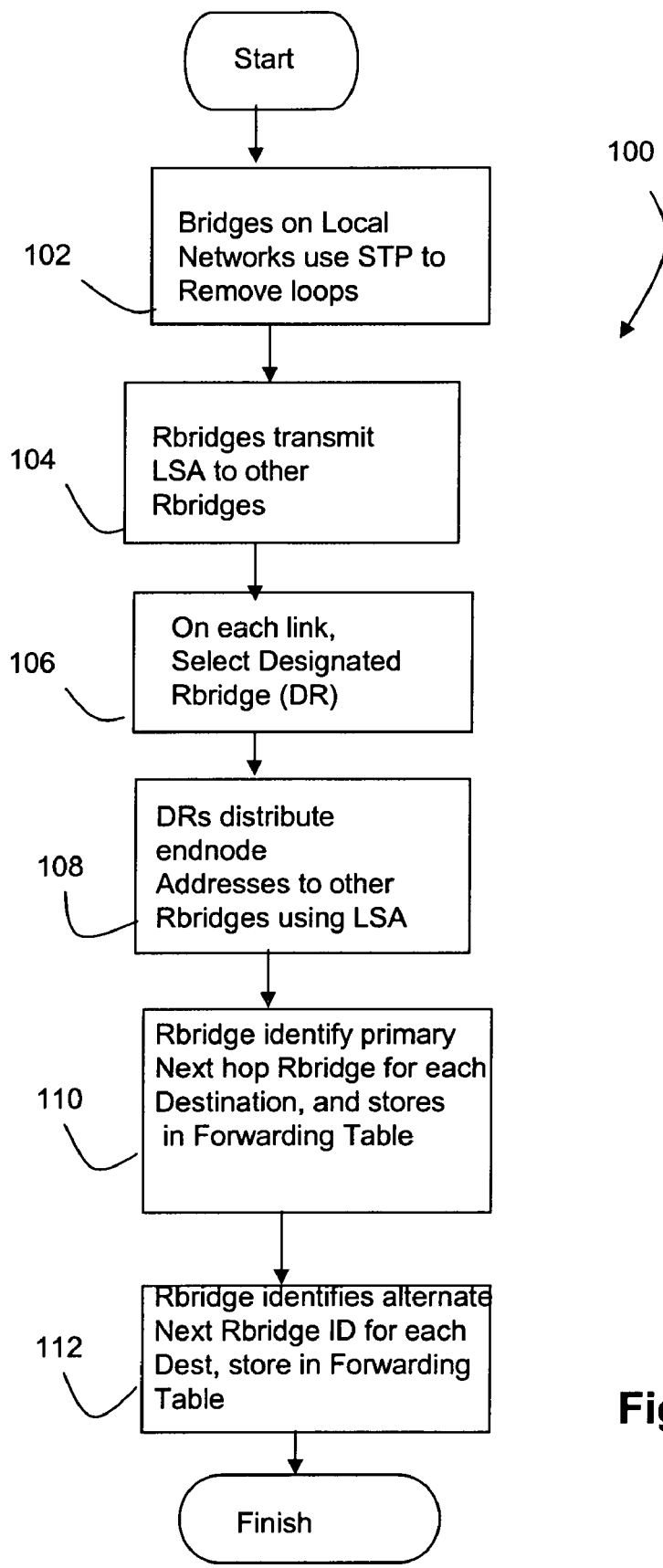
FIG. 2 is a flow diagram provided to illustrate exemplary steps that may be performed to configure the network of FIGS. 1A-1C for use in the present invention.

FIG. 2 illustrates a plurality of steps in a process 100 that may be used to define a network topology in a network that includes Rbridge devices of the present invention. At step 102, each conventional bridge executes the Spanning Tree Protocol to provide a loop-free, logical LAN. For example, FIG. 1A illustrates a plurality of LAN segments S-12a, S-12b, S-12c, and S-12d coupled via legacy bridge devices 20 and 21. Connectivity of the LAN segments is defined using the STP, which identifies loop-free paths to each device. An example of links that may be enabled between the segments is shown in FIG. 1A, which dashed lines indicating those links that are blocked by the STP to remove loops. The resulting is a logical LAN segment 12.

STP is also executed at bridges 22, 23 and 24, and the resultant logical LAN segments 13 and 14 are defined. FIG. 1B illustrates the resultant network topology following completion STP by each bridge 20-24. Note that at this point, each logical LAN segment may be connected to more than one Rbridge device.

At step 104 (FIG. 2), after the bridges have generated the logical LAN segments, the Rbridges exchange link information using link state layer 3 protocols such as OSPF, IS-IS, etc. Using the link information, each Rbridge calculates a broadcast spanning tree for the purpose of delivering layer 2 multicast packets and packets to unknown destinations. When the exchange of link information is complete, every Rbridge will have accumulated a database consisting of all the advertised links and their states generated by each participating Rbridge in the topology.

At step 106 (FIG. 2), after the link state information has been exchanged by the Rbridges, according to the Rbridge protocol, one of the Rbridge devices from a group of Rbridge devices that are coupled to a LAN segment is selected as a Designated Rbridge (DR) device for that LAN segment. All communications between the LAN segment and other network devices will be forwarded through the DR. Any connection between the LAN segment and any other Rbridge device is blocked.

For example, in FIG. 2, Rbridge 1 and Rbridge 2 are both connected to LAN segment 12. Execution of the Rbridge protocol may select Rbridge 2 as the DR for LAN segment 12. Rbridges 2, 3 and Rbridge 5 are all connected to LAN segment 6. Execution of the Rbridge protocol may select Rbridge 3 as the DR for LAN segment 6. Rbridge 1 and Rbridge 4 are connected to LAN segment 13. Execution of the Rbridge protocol may select Rbridge 1 as the DR for LAN segment 6. Rbridge 4 and Rbridge 5 are connected to LAN segment 14, and execution of the Rbridge protocol may select Rbridge 5 as the DR for LAN segment 14 communications.

After selection of Designate Rbridge devices as described above, a resultant network topology is shown in FIG. 1C. The result is a logical core of Rbridge devices through which communications for the various LAN segments are forwarded. Forwarding of communications through the Rbridge core is facilitated through the use of an Rbridge header 9, which encapsulates the packet 8 as it transitions through the Rbridge core.

The encapsulation header allows the Rbridge device to differentiate packets originated by an end node from packets that are transited through the Rbridge core. As will be described in more detail below, the header is used to access a forwarding table which identifies the MAC address of the next Rbridge in the Rbridge core. The encapsulated packet continues to be forwarded through the core until the DR associated with the destination end node is reached, at which point the encapsulated header is stripped from the packet, and the packet is forwarded into the DRs logical subnet, where it is forwarded along the spanning tree to the destination end node.

As shown in FIG. 1C, there are two types of encapsulation headers that may be used in the present invention, 9-A and 9-B. Encapsulation header 9-A includes a type field, a hop count, a layer 2 source address and a layer 2 destination address. The type field is used to indicate that the packet is an Rbridge protocol type packet. The layer 2 source and destination address are the MAC addresses of the sending and receiving Rbridge devices. As will be described in more detail below, encapsulation headers such as 9-A are used when the header is rewritten on a hop by hop basis at each Rbridge device. When forwarding the packet out of the Rbridge core to the destination LAN segment of the end node, the encapsulation header is removed, so that the goal of transparency to end nodes is accomplished, as the destination will see the packet as transmitted by the source.

Header 9-B includes an Egress Rbridge MAC address, an Rbridge protocol type, and a TTL field. As will be described in more detail below, the Egress Rbridge MAC address is inserted in the packet header by an ingress Rbridge device. Forwarding tables of intermediate Rbridge devices are indexed using the Egress Rbridge field of the header to identify next Rbridge devices in the path to the Egress Rbridge. At the Egress Rbridge, the header is removed prior to passing the packet to the subnet. In such an embodiment the encapsulation header is not modified by intermediate nodes (except for the TTL).

At step 108, after the DRs have been identified, each DR learns which end nodes are located on its LAN segment by observing the source address of packets that originate on the LAN segment. The DR distributes the addresses of the end nodes to the other Rbridges using LSAs, thereby enabling all Rbridges to know which Rbridge is the appropriate destination Rbridge for each end node. Each Rbridge includes an end node mapping table for storing end node information associated with each DR. As is described below, the end node mapping table may be used to identify the Egress Rbridges for populating header 9-B.

At step 110, using the LSA and end node mapping table, each R-bridge builds a forwarding table. The forwarding table stores, for each forwarding target, primary next hop Rbridge Identifier, identifying the primary next Rbridge device to which a packet destined for the forwarding target should be forwarded. For the purposes of this application, the forwarding target may be a destination end node or alternatively it may be an egress Rbridge (i.e. a DR that hosts destination end nodes). Any link state protocol may be used to select the primary next hop Rbridge device for reaching the forwarding target.

The present invention supports two methods of packet forwarding. In a first method of packet forwarding, the forwarding target is the destination end node. In such a situation, an ingress Rbridge builds a forwarding table based on the destination end node address. At each Rbridge hop, an encapsulation header such as header 9-A is added to the packet, where the encapsulation header includes the MAC address of the source Rbridge, and the MAC address of the primary next Rbridged device. As the packet is propagated to intermediate Rbridge devices, each intermediate Rbridge device replaces the encapsulated source and destination addresses with their own MAC address and primary next Rbridge MAC address until the packet reaches the Egress Rbridge. At the egress Rbridge, the encapsulation header is stripped from the packet, and forwarded into the subnet.

In another embodiment, the forwarding target is the Egress Rbridge. When a packet is received at an ingress Rbridge, the ingress Rbridge indexes the end node map, to identify the Egress Rbridge associated with the end node MAC address. The packet is encapsulated with a header such as 9-B including the egress Rbridge MAC address, and the forwarding table is indexed using the egress Rbridge MAC address to identify the primary next hop Rbridge to reach the egress MAC address. As the packet is forwarded to intermediate Rbridges, the Rbridge devices merely use the egress Rbridge MAC address included in the encapsulation header to index their forwarding table, and forward the packet on to the next Rbridge device without rewriting the header.

In either case, whether the forwarding target is a destination end node and the packet header is modified on each hop, or the forwarding target is an egress Rbridge, the primary next Rbridge is selected using link state routing protocols to ensure that the packet is forwarded on the 'best' path through the Rbridge core.

At step 112, in addition to selecting a primary next hop Rbridge Identifier, an alternate next hop Rbridge Identifier is additionally stored in the forwarding table of each Rbridge device. The alternate next hop Rbridge Identifier identifies an Rbridge device that is to be used if one or more selected trigger conditions is detected at the primary next hop Rbridge device. As mentioned above, the selected trigger conditions include but are not limited to a detected congestion at the primary next Rbridge, or a failure either the primary next Rbridge or the link to the primary next Rbridge.

One method that may be used to identify an alternate next Rbridge uses a concept that is similar to but distinct from that described with regard to a Reliable Alternate Paths for IP Destination (RAPID) identification processes, as described in Network Working Group Internet Draft "Basic Specification for IP Fast Reroute: Loop-free Alternates" by A. Atlas, draft-ietf-rtgwg-ipfrr-spec-base-04", July 2005, incorporated herein by reference, or as described in the Network Working Group Internet Draft "IP Fast Reroute Framework", draft-ietf-rtgwg-ipfrr-framework-01.txt, June 2004 by Shand, also incorporated herein by reference.

Under the IP Fast Reroute methods described in the above Internet Drafts, a suitable alternate next-hop IP address is selected via a computation that ensures that the alternate path to the destination does not return to the router; i.e., the path is 'loop-free.'

The present invention extends the concepts of Fast IP re-route for use in the layer 2 Routing-Bridge architecture, to allow for fast layer 2 network reconfiguration in the presence of faults or congestion. Thus, the process performed by the present invention may be referred to as "Reliable Alternate Paths for MAC Destinations" (RAPMD). According to the present invention, neighbors of an originating Rbridge device are categorized as either looping neighbors, or loop-free neighbors with respect to each destination. A looping neighbor is a neighbor that will forward a packet back to the originating Rbridge device in an attempt to reach the destination. The forwarding loop may be either a large loop (i.e., the packet will flow through a number of other Rbridges before it is returned to the originating Rbridge) or it may be a micro-loop (i.e., the neighbor would immediately forward the packet back to the originating Rbridge, also referred to as a U-turn). A loop-free neighbor is a neighbor which does not forward the packet back to the originating Rbridge as it forwards the packet to the destination.

The general rule identified by for identifying a loop free neighbor Rbridge uses Equation I below:

An alternate next hop Rbridge neighbor N can provide a loop-free alternate (LFA) between a source S and a destination D if and only if Equation I below is true.

$$\text{Distance}(N,D) < \text{Distance}(N,S) + \text{Distance}(S,D). \quad \text{Equation I}$$

Further conditions may be applied when selecting an alternate next hop Rbridge device associated with a primary next hop Rbridge device. To ensure that an alternate next-hop Rbridge N of a primary neighbor Rbridge E does not use primary neighbor Rbridge E in a downstream path to destination D, Rbridge N must be loop-free with respect to both Rbridge E and Rbridge D. In other words, N's path to Rbridge D must not go through Rbridge E. This is the case if Equation 2 below is true.

$$\text{Distance}(\text{Rbridge}N,D) < \text{Distance}(N,\text{Rbridge}E) + \text{Distance}(\text{Rbridge}E,\text{Rbrige}D) \quad \text{Equation II}$$

The present invention may be used to identify an alternate next hop Rbridge device for fast layer 2 switching in the event of a link or node failure, in the presence of congestion, and upon the detection of a U-turn from a primary next hop Rbridge device, (resulting from congestion or failure downstream of the primary next hop Rbridge device that causes the alternate next hop Rbridge to U-turn packets back to the source). A use of IP Fast Reroute for purposes of overcoming congestion is described in patent application Ser. No. 11/251, 252, entitled "METHOD AND APPARATUS FOR PRESERVING PACKETS DURING NETWORK CONGESTION", filed Oct. 14, 2005, by Ashwood-Smith, incorporated herein by reference. The present invention extends the concepts of the above patent application by recognizing the new use of this technique in a layer 2 Rbridge network.

As discussed above with regard to the primary next Rbridge, the alternate next Rbridge identifier may be stored in a in forwarding table that is indexed using destination end node or Rbridge MAC addresses, or alternatively in a forwarding table that is indexed by an identified Egress Rbridge identifier. Thus the present invention is not limited in any manner to the manner of indexing the forwarding table, or the method used to encapsulate packets as they are forwarded through the network.

Upon the completion of the process 100 of FIG. 2, a network topology has been defined that is capable of quick re-configuration upon the detection of a failure or congestion condition, or detection of a U-turn from the primary next hop Rbridge device. The transition to the alternate Rbridge may be permanent (in the event of a failure) or may be used to provide temporary relief for the primary next Rbridge device during periods of congestion. As a result, alternate Rbridge selection may be performed at a packet granularity. For example, a first packet may use the primary next Rbridge, while a second uses the alternate next Rbridge, and a third uses the primary next Rbridge. With such an arrangement, packets that would be dropped as a result of congestion avoidance techniques such as Random Early Detection need not be discarded, but are transitioned to the alternate next Rbridge for the duration of the congestion. Also note that packets with different priorities may be discarded at different thresholds which means that while some packets may take the primary next Rbridge, even during light congestion, others may use the alternates next Rbridge due to their lower priority.

Figure 3:
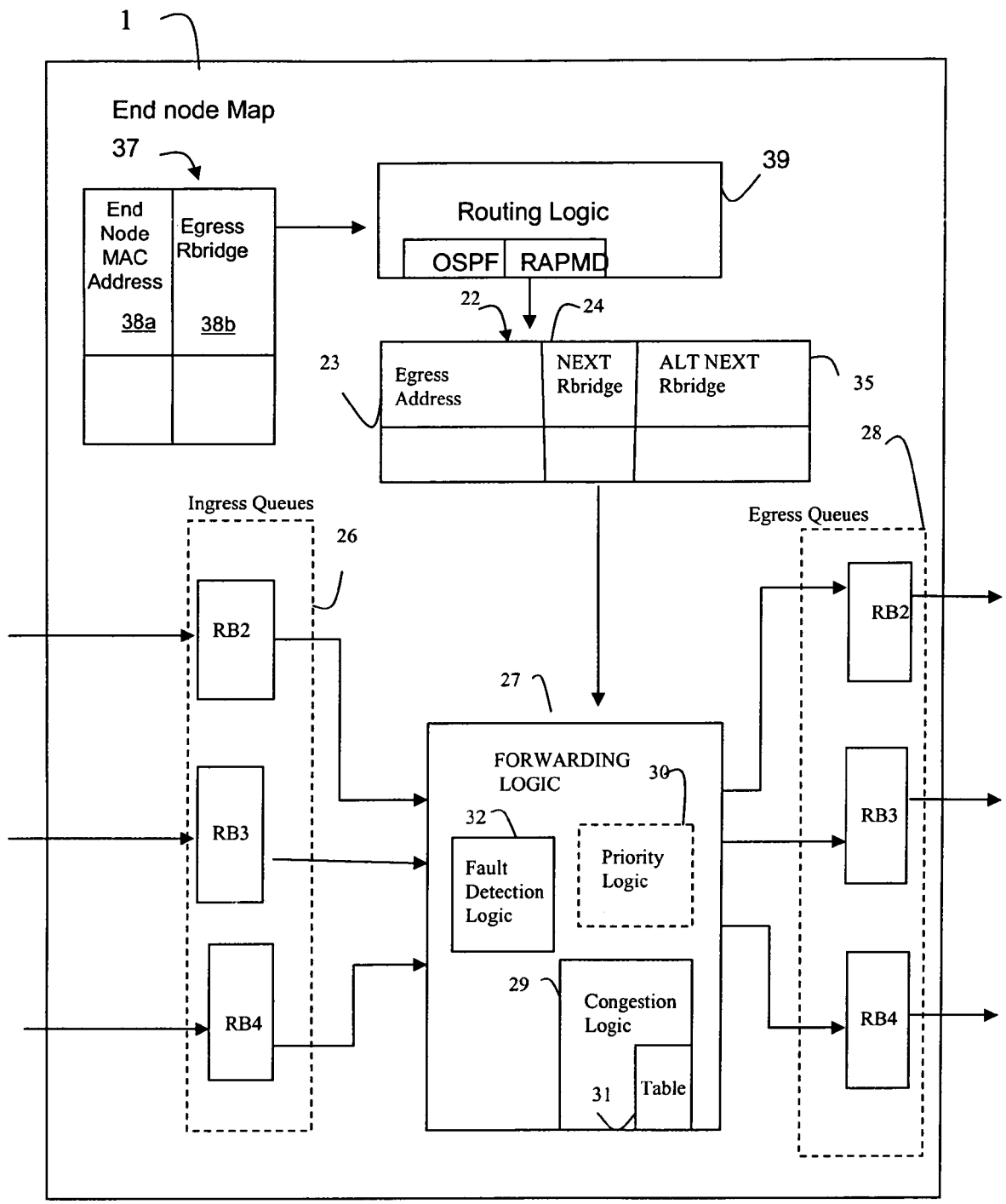
FIG. 3 is a block diagram illustrating several components that may advantageously be included in an Routing Bridge (Rbridge) device supporting the present invention.

FIG. 3 illustrates several components that may be included in a Routing Bridge device capable of implementing the present invention. The Routing-Bridge 1 is shown to include forwarding logic 27 disposed between ingress queues 26 and egress queues 28. Ingress queues include one or more queues that receive packets from each port of the Rbridge. Egress queues generally include one or more queues for storing packets that are to be forwarded out the ports of the Rbridge. FIG. 3, which represents logic that may be included in Rbridge 1 therefore includes ingress and egress queues associated with neighboring Rbridges 2, 3 and 4. The forwarding logic controls the forwarding of packets between the ingress and egress queues. The forwarding logic uses information in the forwarding table 22.

As discussed above, the forwarding table 22 stores, for each forwarding target, a primary Rbridge identifier 25 and an alternate Rbridge identifier 26. The Rbridge also includes routing logic 39 and end node map 37. The routing logic uses link state information collected by the Rbridge to select an appropriate primary and alternate next Rbridge. The routing logic may be a combination of hardware and software that executes a variety of protocols for the purposes of defining the connectivity of the Rbridge device. The routing logic 39 is thus shown to include a link state protocol such as Open Shortest Path First (OSPF), which uses link state information to identify a primary path through the Rbridge core to the destination end points and egress Rbridges and also to compute trees for the purpose of broadcast, and RAPMD for selecting an alternate Rbridge device as described above in the event of a fault, congestion or other trigger condition.

The end node map stores, for each DR, the MAC addresses of end nodes hosted by the DRs. Thus, the end node map can be used to identify the Egress Rbridge device associated with a packet end node destination.

The forwarding logic 27 of the present invention also includes a congestion detection mechanism 29 and a fault detection mechanism 32. The congestion detection mechanism 29 monitors the transfer of packets between ingress queues and egress queues, and detects when packets are dropped due to filling of the egress queues or other pre-overflow mechanisms such as RED etc When a packet is to be dropped, the congestion mechanism signals the forwarding logic that the alternate Rbridge should be used to forward the packet, rather than the primary Rbridge. There may in fact be multiple levels of this behavior depending on the priority of the packet to be transmitted. High priority packets will therefore not see congestion, nor will they react to it, as early as would lower priority packets. In some embodiments of this invention, the congestion avoidance procedure of forwarding to the alternate instead of discarding, may only be applied to a select subset of traffic classes, as opposed to all classes.

In one embodiment of the invention, the forwarding logic may optionally include priority logic 30 (shown in dashed lines in FIG. 3 to indicate that it is not a requirement of the invention). Priority logic 30 may be used to change the priority of a packet that is sent to an alternate Rbridge. Priority logic may decrease (or otherwise adjust) the priority of the packet so that the packet, which was destined to be discarded, does not cause other packets to be dropped at the alternate Rbridge. Alternatively, priority logic may, increase the priority of a packet that was destined to be discarded, to ensure that the packet does not get dropped in favor of other traffic at the alternate Rbridge. Different fields in the packet themselves may cause the priority logic to alter the packet priority, including the packet protocol, source address, destination address, the packet Type of Service (TOS), certain flags, etc. Priority may be altered by modifying the TOS or Time To Live (TTL) field.

Fault detection logic 32 may also cause the forwarding logic to use the alternate Rbridge rather than the primary Rbridge. The fault detection logic monitors traffic forwarded from the Rbridge to identify a fault condition at the primary Rbridge. The fault condition may be detected using any one of a variety of known methods of determining node or link failure, including monitoring traffic for responses to status requests, detecting a high level of dropped packets destined for the primary next Rbridge, or other known techniques. When a fault is detected at any coupled Rbridge device, the fault detection logic signals the forwarding logic to cease forwarding packets to the faulted Rbridge. Any subsequent transmissions destined for the Rbridge will be forwarded to the alternate Rbridge.

Figure 4:
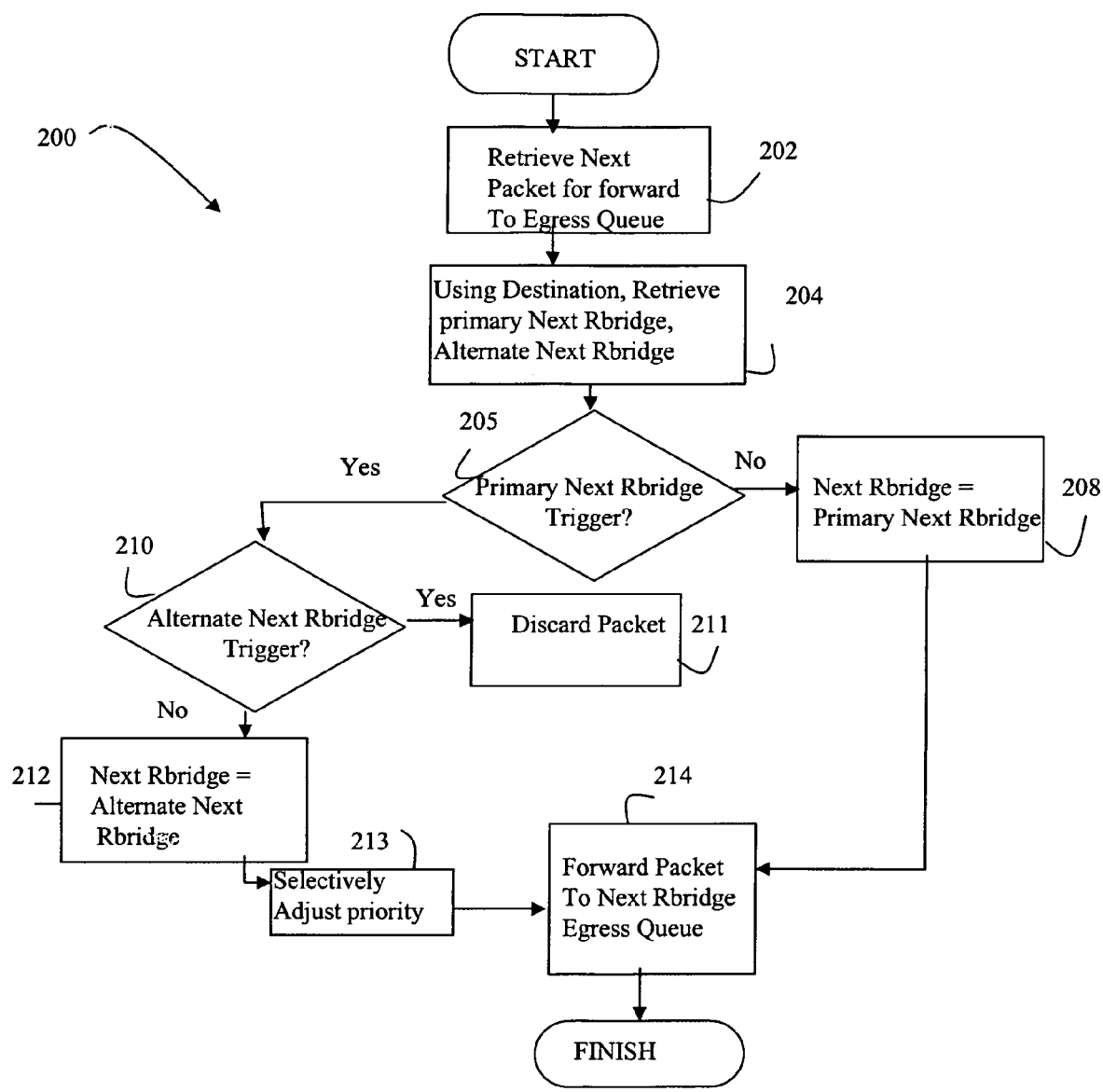
FIG. 4 is a flow diagram illustrating exemplary steps that may be performed during fast layer 2 reconfiguration by the present invention.

Referring now to FIG. 4, a process 200 is shown that may be used to forward packets via an identified alternate Rbridge in response to the detection of a trigger condition such as failure or congestion of the primary Rbridge. At step 202, a packet is retrieved from one of the ingress queues 26 for forwarding to one of the egress queues 28. At step 204, the destination is extracted from the packet and used to retrieve a primary and alternate Rbridge identifier from the route forwarding table. At step 205 it is determined whether or not a trigger condition exists at the primary Rbridge. If no trigger condition is detected, then at step 208 the primary next Rbridge identifier is inserted in the Rbridge Identifier field of the packet, and the process proceeds to step 214 where the packet is placed in the appropriate egress queue.

If at step 205 it was determined that a trigger condition existed at the primary Rbridge, at step 210 it is determined whether there is also a trigger condition present at the alternate Rbridge. If so, at step 211 the packet is discarded. If it is determined at step 210 that there is no trigger condition at the alternate Rbridge, then at step 212. the packet is forwarded to the Rbridge device indicated by the alternate Rbridge identifier stored in the forwarding table. At step 213 the priority of packet is selectively altered, as described above and at step 214 the packet is placed in the appropriate egress queue.

Figure 5:
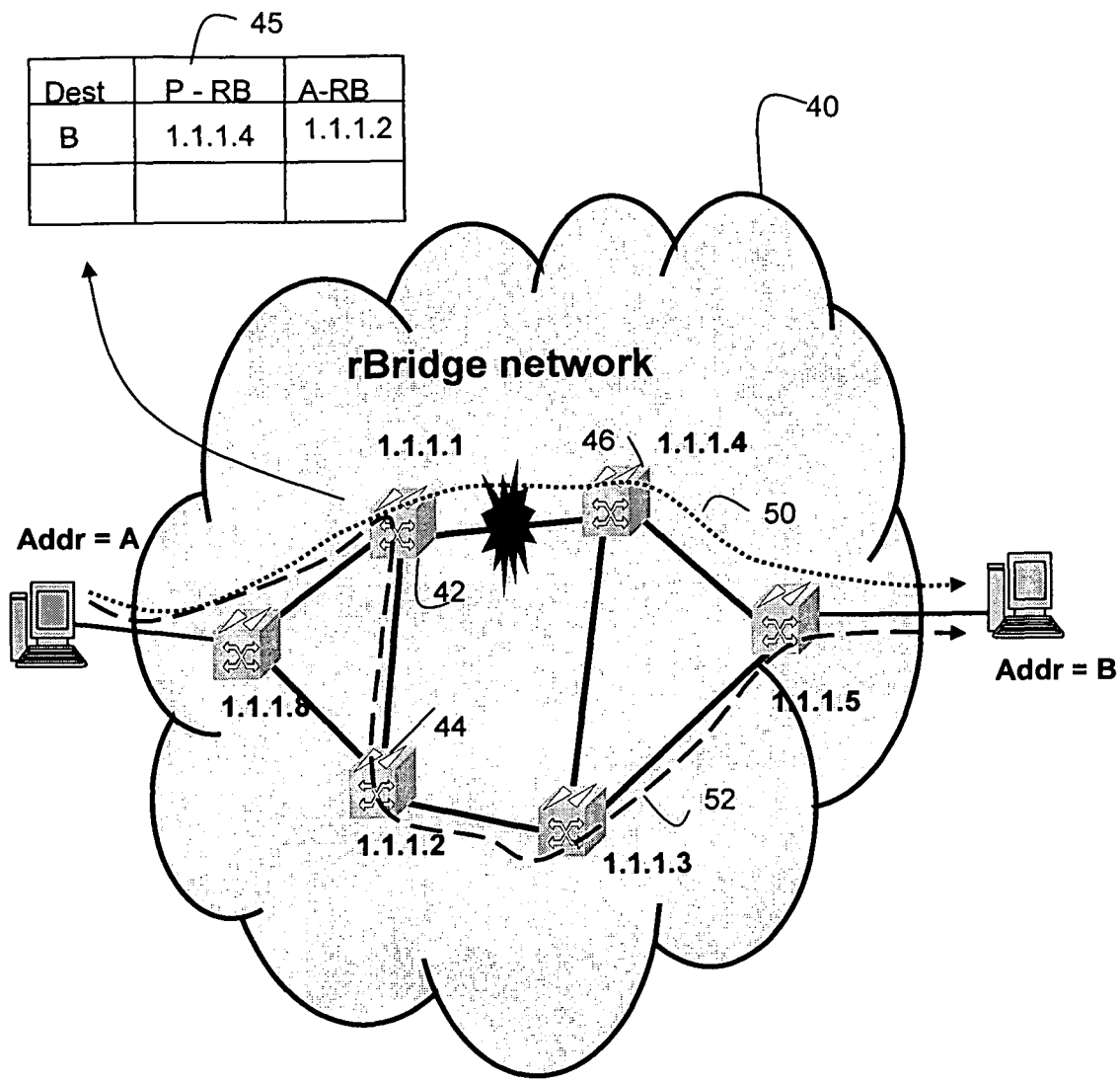
FIG. 5 is a diagram of an Rbridge network provided to illustrate the operation of fast layer 2 reconfiguration by the present invention.

FIG. 5 illustrates an example of the operation of the present invention in Rbridge network 40. A primary communication path 50 (shown in dotted lines in FIG. 5) is selected for communications between end nodes A and B. After the path is identified, the primary next Rbridge identifier is stored in the forwarding table 45 of Rbridge 42. Thus forwarding table stores an Rbridge identifier of 1.1.1.4 for destination end node B. The Rbridge identifier is the Medium Access Control (MAC) address of the Rbridge device.

As described in FIG. 2, forwarding table 45 also stores a MAC address of an alternate Rbridge identifier (A-RB). The alternate Rbridge identifier is the MAC address of the first Rbridge device in an alternate path to the end node, where the alternate next Rbridge is identified using Fast Re-routing techniques described above. The alternate Rbridge identifier in this example is 1.1.1.2.

Upon detection of a triggering event such as a failed link, node, or congestion at primary Rbridge 1.1.1.4, the Rbridge 42 quickly re-directs traffic to the MAC address of the alternate Rbridge. As shown in FIG. 5, traffic is thus redirected along path 52 to the end node B.

Accordingly a method and apparatus that may be used to provide fast reconfiguration of layer 2 forwarding in the presence of congestion, failure, u-turn detection or other trigger condition has been shown and described. By identifying an alternate next Rbridge device in advance of the trigger condition, and storing the MAC address of the alternate next Rbridge device in along with the primary next Rbridge MAC address facilitates reconfiguration of end node communications.

Having described exemplary embodiments of the invention, it will be appreciated that differently delineated functional equivalents may be readily substituted herein without affecting the scope of the invention. In addition, many of the above figures are flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem.

The above description and figures have included various process steps and components that are illustrative of operations that are performed by the present invention. However, although certain components and steps have been described, it is understood that the descriptions are representative only, other functional delineations or additional steps and components can be added by one of skill in the art, and thus the present invention should not be limited to the specific embodiments disclosed. In addition it is understood that the various representational elements may be implemented in hardware, software running on a computer, or a combination thereof.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

The invention claimed is:

1. A method of re-configuring a network comprising a plurality of routing-bridges (Rbridges) includes the steps of:
   computing, prior to detection of a trigger condition, an identifier of a primary Rbridge device and an identifier of an alternate Rbridge device to which communications destined for a forwarding target should be forwarded;
   also prior to detection of the trigger condition, storing at a designated Routing Bridge (Rbridge), for the forwarding target, the primary identifier of the primary Rbridge and the alternate identifier of the alternate Rbridge; and
   selectively forwarding a packet destined for the forwarding target to either the primary Rbridge or the alternate Rbridge device in response to a detection of a trigger condition at the primary Rbridge;
   wherein the trigger condition is one of:
      a failure associated with primary Rbridge communications;
      congestion associated with the primary Rbridge communications; and
      detection of a u-turn condition, indicating that the packet received at an Rbridge device was received from a primary next Rbridge device.

2. The method of claim 1, wherein the primary identifier and the alternate identifier are layer 2 addresses of the respective primary Rbridge and alternate Rbridge devices.

3. The method according to claim 1, further including the step of modifying a priority of a packet following detection of congestion at the primary Rbridge.

4. The method according to claim 1, wherein the step of storing the alternate identifier includes the step of selecting the alternate Rbridge device using Reliable Alternate Path for MAC Destinations methods.

5. The method of claim 1, wherein the forwarding target is an end point in the Rbridge network.

6. The method of claim 1, wherein the forwarding target is an Rbridge egress device associated with an end point in the Rbridge network.

7. The method according to claim 1, wherein the step of selectively forwarding the packet includes encapsulating the packet with a header including a MAC address of the Rbridge and a MAC address of a selected one of the primary and alternate Rbridge devices.

8. The method according to claim 1, further including the step of:
   identifying an Egress Rbridge device associated with a destination end node in the packet; and
   wherein the step of selectively forwarding the packet includes encapsulating the packet with a header including a MAC address of the Egress Rbridge.

9. A routing bridge device including:
   a primary Rbridge device,
   an alternate Rbridge device,
   a non-transitory computer readable medium of the routing bridge device storing a table, the table including an entry associated with a forwarding target, the entry including a primary identifier of the primary Rbridge device and an alternate identifier of the alternate Rbridge device, the primary Rbridge and alternate Rbridge identifiers identifying respective primary Rbridge and alternate Rbridge devices to which communications destined for the forwarding target should be forwarded, and the primary Rbridge and alternate Rbridge identifiers being computed and stored in the table prior to detection of a trigger condition; and a forwarding logic of the routing bridge device coupled to the table for selectively forwarding a packet destined for the forwarding target to either the primary Rbridge or the alternate Rbridge device in response to a detection of a trigger condition at the primary Rbridge;

wherein the trigger condition is one of:

a failure associated with primary Rbridge communications;

congestion associated with the primary Rbridge communications; and detection of a u-turn condition, indicating that the packet received at an Rbridge device was received from a primary next Rbridge device.

10. The routing bridge of claim 9, wherein the primary identifier and the alternate identifier are layer 2 addresses of the respective primary Rbridge and alternate Rbridge devices.

11. The routing bridge according to claim 9, further comprising:

Reliable Alternate Path for MAC Destinations logic for selecting the alternate Rbridge device.

12. The routing bridge of claim 9, wherein the forwarding target is an end node in a network.

13. The routing bridge of claim 9, wherein the forwarding target is an Egress Rbridge identified with an end node in a network.

14. The routing bridge of claim 9, further comprising:

an end node mapping table, for associating end node MAC addresses with Egress Rbridge MAC addresses.

* * * * *